United States Patent
Imai et al.

(10) Patent No.: US 7,587,634 B2
(45) Date of Patent: Sep. 8, 2009

(54) NETWORK FAULT DIAGNOSTIC DEVICE, NETWORK FAULT DIAGNOSTIC METHOD, AND COMPUTER PRODUCT

(75) Inventors: Satoshi Imai, Kawasaki (JP); Akira Chugo, Kawasaki (JP); Hitoshi Ueno, Kawasaki (JP); Akiko Yamada, Kawasaki (JP); Hitoshi Yamada, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 11/360,945

(22) Filed: Feb. 23, 2006

(65) Prior Publication Data

US 2007/0074076 A1  Mar. 29, 2007

(30) Foreign Application Priority Data

Sep. 29, 2005 (JP) ............... 2005-283976

(51) Int. Cl.
*G06F 11/00* (2006.01)
(52) U.S. Cl. ...................................... 714/26
(58) Field of Classification Search .................. 714/26
See application file for complete search history.

(56) References Cited

U.S. PATENT DOCUMENTS

| | | | | |
|---|---|---|---|---|
| 4,633,467 A | * | 12/1986 | Abel et al. ................ | 714/45 |
| 5,309,448 A | * | 5/1994 | Bouloutas et al. ........... | 714/25 |
| 5,528,516 A | | 6/1996 | Yemini et al. | |
| 5,646,864 A | * | 7/1997 | Whitney ................... | 714/47 |
| 5,748,098 A | * | 5/1998 | Grace ...................... | 370/242 |
| 6,000,045 A | * | 12/1999 | Lewis ...................... | 714/47 |
| 6,006,016 A | * | 12/1999 | Faigon et al. .............. | 714/48 |
| 6,226,760 B1 | * | 5/2001 | Burkhardt et al. .......... | 714/33 |
| 6,604,208 B1 | * | 8/2003 | Gosselin et al. ............ | 714/4 |
| 6,807,583 B2 | * | 10/2004 | Hrischuk et al. ........... | 719/318 |
| 6,820,044 B2 | * | 11/2004 | Groen et al. ............... | 703/2 |
| 6,871,299 B2 | * | 3/2005 | Havekost et al. ........... | 714/47 |
| 6,966,015 B2 | * | 11/2005 | Steinberg et al. ........... | 714/47 |
| 7,016,806 B2 | * | 3/2006 | Lambert et al. ............ | 702/181 |
| 7,043,661 B2 | * | 5/2006 | Valadarsky et al. .......... | 714/4 |
| 7,318,178 B2 | * | 1/2008 | Steinberg et al. ........... | 714/47 |
| 7,350,106 B2 | * | 3/2008 | Longere .................... | 714/25 |
| 7,412,369 B1 | * | 8/2008 | Gupta ...................... | 703/14 |

FOREIGN PATENT DOCUMENTS

JP    5-114899    5/1993

* cited by examiner

*Primary Examiner*—Robert Beausoliel
*Assistant Examiner*—Amine Riad
(74) *Attorney, Agent, or Firm*—Fujitsu Patent Center

(57) ABSTRACT

A network fault diagnostic device is configured in the following manner. A causal relation table stores causal relations between faults and events, and a monitor event selector refers to the causal relation table to extract a minimum event required for identifying a fault, and sets the event as a monitor event. The acquisition-event selector selects events from the causal relation table based on latest fault candidates, and sets priorities of the events selected, in the order of efficiently identifying faults. The event acquiring unit requests events in the order of the priorities set, and the event receiving unit receives each event in response to the respective requests. The fault determining unit narrows down the candidates of the fault based on the events received one by one.

10 Claims, 19 Drawing Sheets

FIG.2

|    | P1  | P2  | P3  | P4  | P5  |
|----|-----|-----|-----|-----|-----|
| E1 | 1   | 1   | 1   | 0   | 0   |
| E2 | 1   | 0   | 0   | 1   | 0   |
| E3 | 0   | 0   | 1   | 0   | 1   |
| E4 | 0   | 0.9 | 0.9 | 0.9 | 0   |
| E5 | 0.8 | 0.8 | 0   | 0   | 0.8 |
| E6 | 0   | 0.9 | 0   | 0.9 | 0.9 |
| E7 | 0   | 0.7 | 0   | 1   | 0.7 |

E1–E4: TRAP
E5–E7: PERIODIC POLLING

CAUSAL RELATION TABLE

|    | P1  | P2  | P3  | P4  | P5  |
|----|-----|-----|-----|-----|-----|
| E1 | 1   | 1   | 1   | 0   | 0   |
| E2 | 1   | 0   | 0   | 1   | 0   |
| E3 | 0   | 0   | 1   | 0   | 1   |
| E4 | 0   | 0.9 | 0.9 | 0.9 | 0   |
| E5 | 0.8 | 0.8 | 0   | 0   | 0.8 |
| E6 | 0   | 0.9 | 0   | 0.9 | 0.9 |
| E7 | 0   | 0.7 | 0   | 0.7 | 0.7 |

PRIORITY

| 3.8  |
|------|
| 3.8  |
| 3.8  |
| 3.92 |
| 4.04 |
| 3.92 |
| 4.16 |

ACQUISITION ORDER

| 1 |
|---|
| 2 |
| 3 |
| 4 |
| 6 |
| 5 |
| 7 |

FIG.10

CAUSAL RELATION TABLE

| | P1 | P2 | P3 | P4 | P5 |
|---|---|---|---|---|---|
| E1 | 1 | 1 | 1 | 0 | 0 |
| E2 | 1 | 0 | 0 | 1 | 0 |
| E3 | 0 | 0 | 1 | 0 | 1 |
| E4 | 0 | 0.9 | 0.9 | 0.9 | 0 |
| E5 | 0.8 | 0.8 | 0 | 0 | 0.8 |
| E6 | 0 | 0.9 | 0 | 0.9 | 0.9 |
| E7 | 0 | 0.7 | 0 | 1 | 0.7 |

TRAP: E1–E4
POLLING: E5–E7

1. RECEPTION OF TRAP E1

FAULT CANDIDATE = {P1,P2,P3}

| | P1 | P2 | P3 |
   |---|---|---|---|
   | CERTAINTY | 1 | 1 | 1 |

2. ACQUISITION OF FAULT-TRIGGER POLLING E5

FAULT CANDIDATE = {P1,P2}

| | P1 | P2 | P3 |
   |---|---|---|---|
   | CERTAINTY | 1.8 | 1.8 | - |

3. ACQUISITION OF FAULT-TRIGGER POLLING E7→NO SIGN OF FAULT

FAULT CANDIDATE = {P1,P2}

| | P1 | P2 | P3 |
   |---|---|---|---|
   | CERTAINTY | 2.8 | 2.1 | - |

4. ACQUISITION OF TRAP E2

FAULT CANDIDATE = {P1}

| | P1 | P2 | P3 |
   |---|---|---|---|
   | CERTAINTY | 3.8 | - | - |

FIG.17
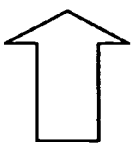
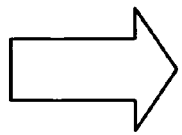
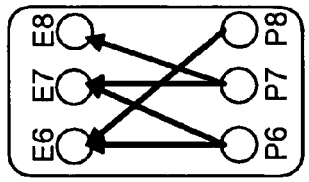
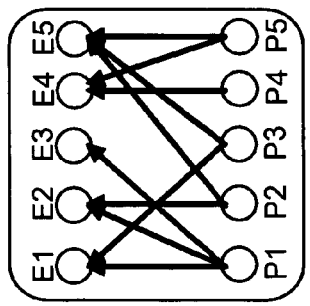
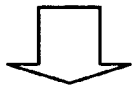

FIG.18

| E1 | TABLE A |
|---|---|
| E2 | TABLE A |
| E3 | TABLE A |
| E4 | TABLE A |
| E5 | TABLE A |
| E6 | TABLE B |
| E7 | TABLE B |
| E8 | TABLE B | though
NETWORK FAULT DIAGNOSTIC DEVICE, NETWORK FAULT DIAGNOSTIC METHOD, AND COMPUTER PRODUCT

BACKGROUND OF THE INVENTION

1. Field of the Invention

The present invention relates to a technology for identifying a fault based on a causal relation between a fault occurring on a network and an event indicating a sign of the fault.

2. Description of the Related Art

Recently, networks are widely being used for exchanging and sharing information in various fields, and are becoming increasingly important. Therefore, it is extremely important to find out a fault as early as possible by always monitoring networks and preventing development of the fault to the vital state of the network.

Generally, automatic monitoring tools are used for network monitoring. The automatic monitoring tool collects events reported by a network device upon occurrence of a fault, analyses the events to identify the fault, and notifies a network administrator of the occurrence of the fault.

As an example of such automatic monitoring tools, U.S. Pat. No. 5,528,516 discloses a technology for previously determining, as a pattern, a causal relation between a fault occurring on a network and an event occurring with the fault, and comparing the pattern with a pattern acquired when the fault occurs, thereby efficiently identify a primary cause of the fault.

However, there are an enormous number of events reported from a network device when a fault occurs, and the increase in the traffic causes an increase in load on the network.

SUMMARY OF THE INVENTION

It is an object of the present invention to at least solve the problems in the conventional technology.

According to an aspect of the present invention, a network fault diagnostic device that identifies a fault based on a causal relation between a fault occurring on a network and an event indicating a sign of the fault includes a storage unit that stores therein a probability of an event for a fault occurring on the network in correlation with the causal relation between the fault and the event; an event acquiring unit that selects a minimum event required for identifying the fault from events of which probabilities are stored in the storage unit and acquires selected event from each device connected to the network; and a fault determining unit that identifies the fault by extracting a set of fault candidates corresponding to the event acquired by the event acquiring unit, from faults stored in the storage unit, and obtaining a set common with fault candidates corresponding to the event acquired by the event acquiring unit.

According to another aspect of the present invention, a method of identifying a fault based on a causal relation between a fault occurring on a network and an event indicating a sign of the fault includes preparing a probability of an event for a fault occurring on the network in correlation with the causal relation between the fault and the event; selecting a minimum event required for identifying the fault from events of which probabilities are prepared at preparing; acquiring the event selected at the selecting from each device connected to the network; and identifying the fault by extracting a set of fault candidates corresponding to the event acquired at the acquiring, from faults prepared at the preparing, and obtaining a set common with fault candidates corresponding to the event acquired at the acquiring.

According to still another aspect of the present invention, an event selecting device that selects an event to be acquired from a network device based on a causal relation between a fault occurring on a network and an event indicating a sign of the fault includes a storage unit that stores therein a probability of an event for a fault occurring on the network in correlation with the causal relation between the fault and the event; and an event selector that selects a minimum event required for identifying the fault occurring on the network, from events of which probabilities are stored in the storage unit, and that sets selected event as an event to be acquired from each device connected to the network.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram of an example of a causal relation table;

FIG. 10 is a diagram of a procedure for determining a fault;

FIG. 17 is a diagram of a procedure for dividing a causal relation table;

FIG. 18 is a diagram of an example of a distribution table;

DETAILED DESCRIPTION OF THE PREFERRED EMBODIMENTS

Exemplary embodiments according to the present invention are explained in detail below with reference to the accompanying drawings.

Figure 1:
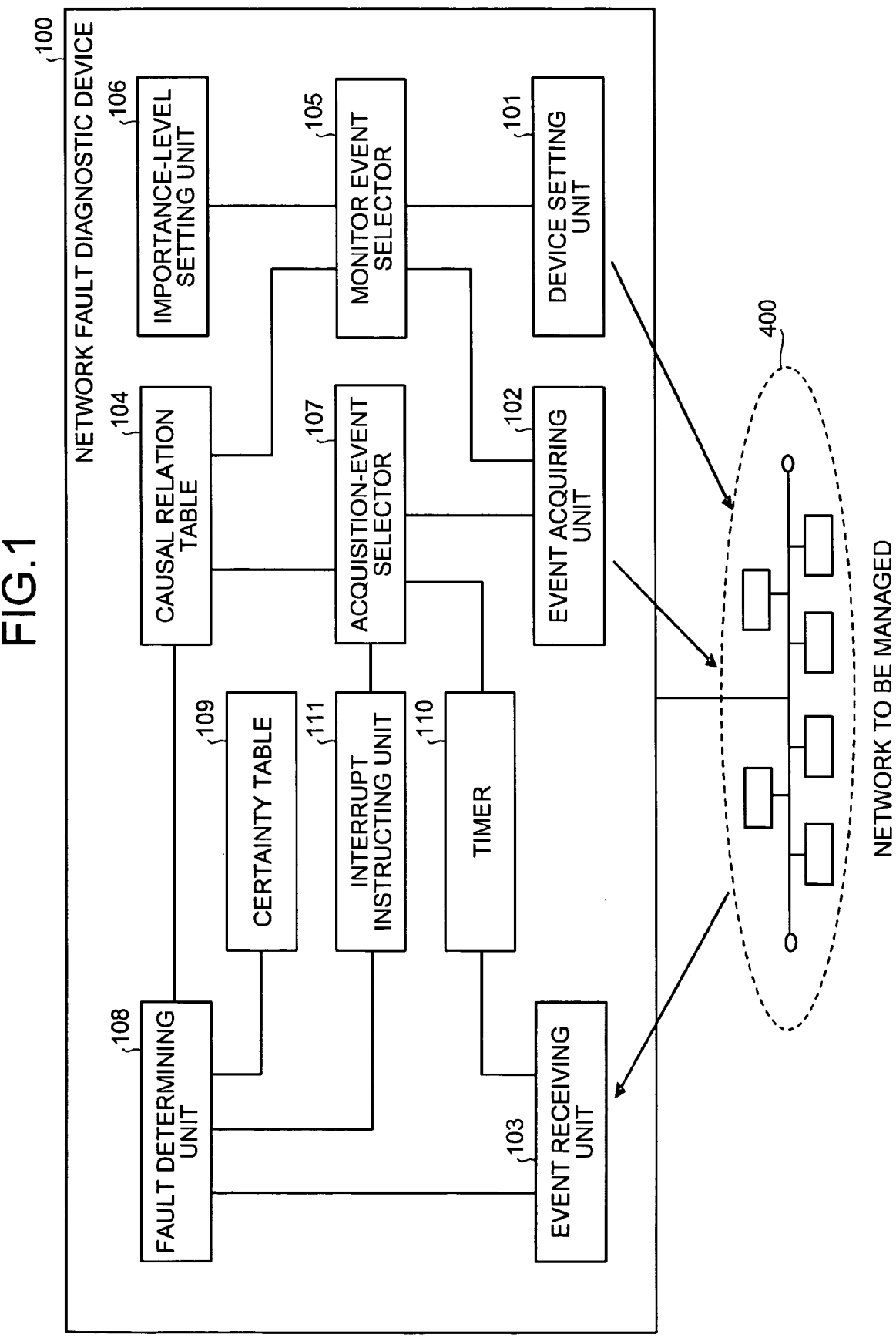
FIG. 1 is a functional block diagram of a network fault diagnostic device according to a first embodiment of the present invention.

FIG. 1 is a functional block diagram of a network fault diagnostic device according to a first embodiment of the present invention. A network fault diagnostic device 100 is connected to a network 400 to be managed being a target of which fault is monitored.

The network fault diagnostic device 100 includes a device setting unit 101, an event acquiring unit 102, an event receiving unit 103, a causal relation table 104, a monitor event selector 105, an importance-level setting unit 106, an acquisition-event selector 107, a fault determining unit 108, a certainty table 109, a timer 110, and an interrupt instructing unit 111.

The device setting unit 101 is a processor that sets a trap event selected by the monitor event selector 105, explained later, in each device connected to the network 400. Upon occurrence of a fault, when each device connected to the network 400 detects the trap event set in its own device, the device voluntarily transmits the trap event to the network fault diagnostic device 100.

The event acquiring unit 102 is a processor that monitors sampling and acquires a fault trigger event from each device connected to the network 400. More specifically, the event acquiring unit 102 periodically requests a periodic polling event selected by the monitor event selector 105 explained later, from each device connected to the network 400 (sampling monitor). Furthermore, the event acquiring unit 102 requests a fault-trigger polling event selected by the acquisition-event selector 107 explained later, from each device connected to the network 400, according to an acquisition order decided by the acquisition-event selector 107 (acquisition of a fault trigger event).

The event receiving unit 103 is a processor that receives an event transmitted from each device connected to the network 400. More specifically, the event receiving unit 103 receives a trap event voluntarily transmitted by each device, and a periodic polling event and a fault-trigger polling event transmitted by each device in response to the request from the event acquiring unit 102.

The causal relation table 104 is a memory unit that stores causal relations between events and faults. FIG. 2 is a diagram of an example of a causal relation table. The causal relation table 104 stores probabilities of events for faults in correlation with the causal relations. The events are classified into a trap event or a periodic polling event. In the example of FIG. 2, the probabilities of events E1 to E7 for faults P1 to P5 are stored. The events $E_1$ to E4 are classified to the trap event, and events E5 to $E_7$ are classified to the periodic polling event.

The monitor event selector 105 is a processor that selects minimum events required for identifying a fault occurring on the network 400 from the causal relation table 104, and sets the events selected as "monitor events". The monitor events mentioned here indicate the trap event and the periodic polling event. More specifically, the monitor event selector 105 selects a minimum trap event required for identifying a fault from the causal relation table 104, and sets the trap event selected in each device connected to the network 400, via the device setting unit 101. Furthermore, the monitor event selector 105 selects a required minimum periodic polling event and sets it, as a target event for sampling monitor, in the event acquiring unit 102.

Figure 3:
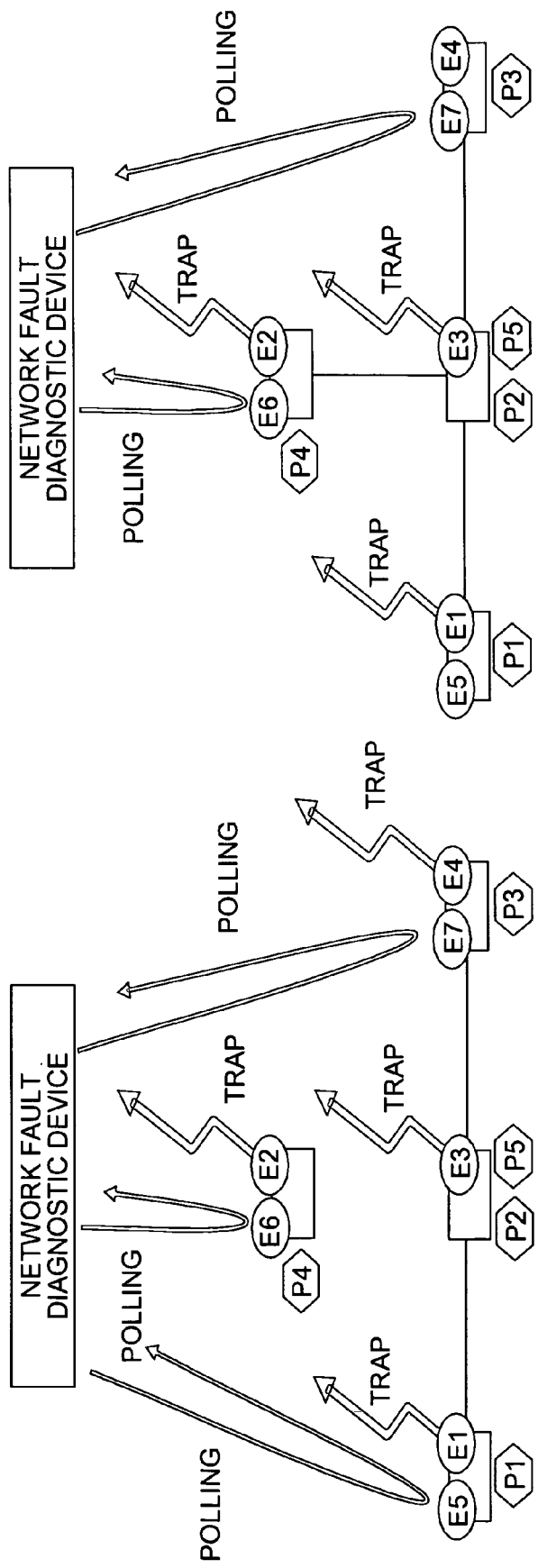
FIG. 3 is a diagram of how the traffic changes by selecting a monitor event.

FIG. 3 is a diagram of how the traffic changes by selecting monitor events. The example of FIG. 3 indicates the following case. That is, the trap events $E_1$ to E4 and the periodic polling events E5 to $E_7$ are stored in the causal relation table 104, and the minimum events required for identifying the fault are the trap events $E_1$, E2, and $E_3$ and the periodic polling events $E_6$ and $E_7$. In this case, the trap event $E_4$ and the periodic polling event $E_5$ are excluded from the events that are exchanged between the network fault diagnostic device 100 and the network 400, as the result of selecting the monitor events. In other words, the traffic between the network fault diagnostic device 100 and the network 400 is reduced.

The procedure for selecting minimum monitor events required for identifying a fault by the monitor event selector 105 is explained below. At first, the monitor event selector 105 calculates a difference $dij(E_k)=P(E_k|P_i)-P(E_k|Pj)$, i.e., the difference $dij(E_k)$ between probabilities of an event Ek for a combination of faults with their order $\{Pi, Pj\}$, $i \neq j$. The calculation is performed based on probabilities $P(E_k|P_i)$, i.e., the probabilities P of the event Ek when the fault Pi occurs, stored in the causal relation table 104, and a discrimination table is created. At this time, if $P(E_k|Pj)>0$, then, $dij(E_k)=0$.

FIG. 4 to FIG. 7 are diagrams of a procedure for selecting monitor events. In the examples, discrimination tables are created based on the causal relation table 104 of FIG. 1. In the discrimination tables of FIG. 4 to FIG. 7, blanks of $dij(E_k)$ indicate $dij(E_k)=0$.

The monitor event selector 105 sequentially selects minimum events required for determining a fault from the discrimination table created, and employs the events as monitor events. At first, initial values are set as a flag value Fij, a discrimination degree dij, and a determination degree Jk, these being used for selecting events.

The flag value $F_{ij}$ mentioned here is a value to determine a combination of faults $\{Pi, Pj\}$ that can be identified by the events employed as the monitor events. As the initial value, a value of 0 is set to the flag value $F_{ij}$.

The discrimination degree dij mentioned here is a total sum of each difference dij ($E_k$) between probabilities of an event Ek for each combination of faults $\{Pi, Pj\}$. As the initial value, a value calculated by dij=Σkdij(Ek) is set to the discrimination degree dij.

The determination degree $J_k$ mentioned here is a value indicating a degree at which a combination of faults $\{P_i, P_j\}$ for each event Ek can be identified by the relevant event. As the initial value, a value calculated by J(Ek)=Σijdij(Ek) is set to the determination degree $J_k$.

The monitor event selector 105 performs a monitor-event selection process after the initial values are set to the flag value $F_{ij}$, the discrimination degree $d_{ij}$, and the determination degree $J_k$, respectively. More specifically, at first, the monitor event selector 105 selects combinations $\{Pi, Pj\}$ in which the flag value $F_{ij}$ is $0 \leq F_{ij} <1$, from combinations of faults $\{P_i, P_j\}$ stored in the discrimination table. The monitor event selector 105 further selects a combination $\{Pi, Pj\}$ in which the discrimination degree dij is the minimum value, from the combinations $\{P_i, P_j\}$ selected.

Then, the monitor event selector 105 selects events Ek in which each difference dij ($E_k$) between probabilities of events Ek for the combination $\{Pi, Pj\}$ selected is $dij(E_k) \neq 0$. The monitor event selector 105 further selects an event Ek in which the determination degree Jk is the maximum value, from the events Ek selected, and employs the event Ek as a monitor event.

Figure 4:
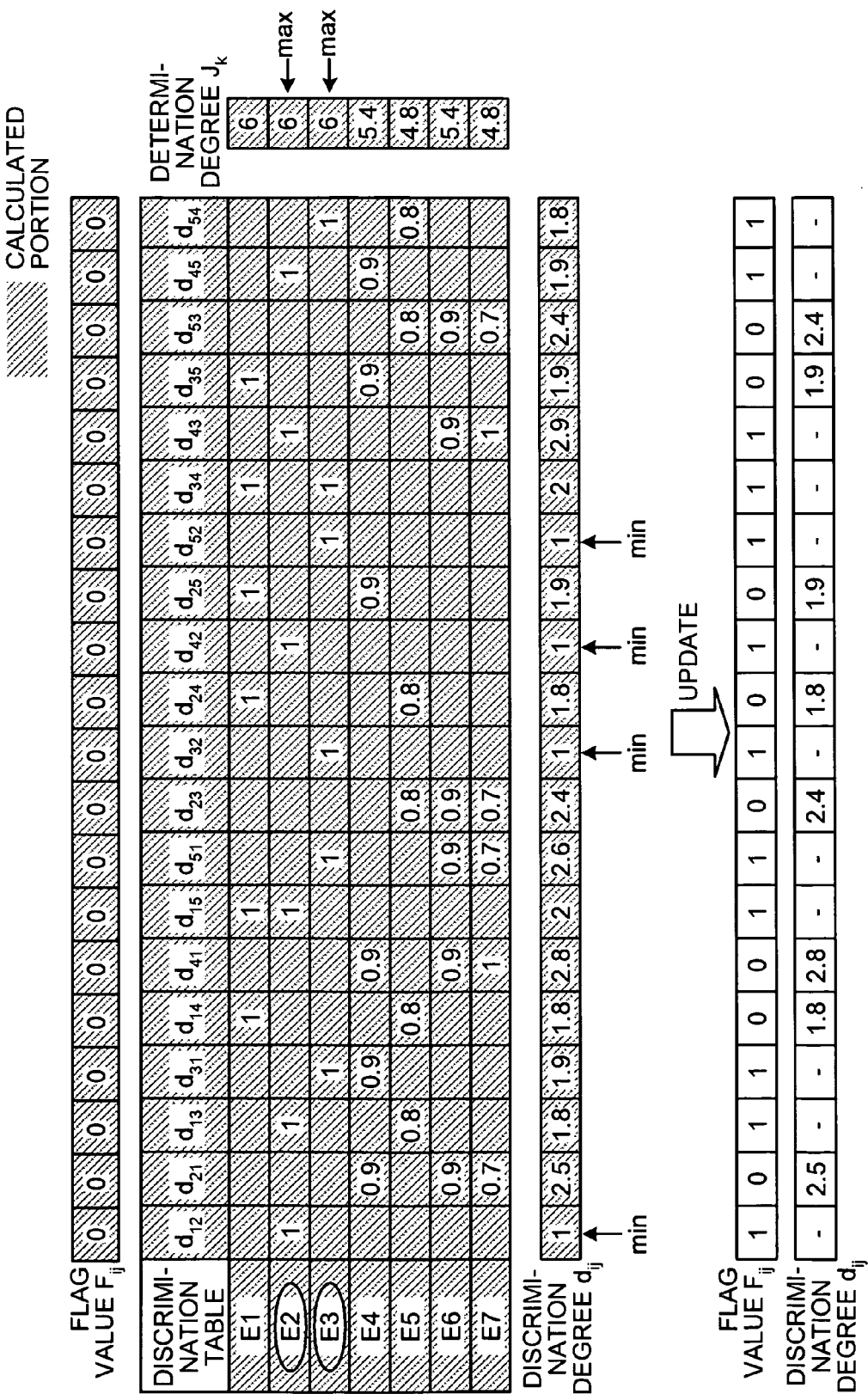
FIG. 4 is a diagram (1) of a procedure for selecting a monitor event.

Because all of flag values $F_{12}$ to $F_{54}$ is 0 in the example of FIG. 4, the monitor event selector 105 first selects all the combinations of faults, and further selects combinations of faults {P1, P2}, {P3, P2}, {P4, P2}, and {P5, P2} because values of their discrimination degrees $d_{12}=1$, $d_{32}=1$, $d_{42}=1$, and $d_{52}=1$ are minimum.

Then, because the probabilities of events $E_k$ for respective combinations of faults are d12(E2)=1, d32(E3)=1, d42(E2)=1, and d52(E3)=1, the events E2 and E3 are selected, and because the determination degrees are J2=6 and J3=6 which are the maximum values, the events $E_2$ and $E_3$ are employed as monitor events.

Flag Fij values are calculated for an event group already employed as monitor events. The flag Fij is calculated by the following calculation equation, where $\hat{E}$ is the event group already employed as monitor events:

$$F_{ij} = \sum_{\{k|\hat{E}_k \in \hat{E}\}} d_{ij}(\hat{E}_k) \quad (2)$$

The difference $d_{ij}(\hat{E}_k)$ between probabilities of each of the events $\hat{E}_k$ employed as the monitor events for each combination {Pi, Pj} is subtracted from the discrimination degree dij of each combination {Pi, Pj}, and a value obtained is set as a new discrimination degree $d_{ij}$. That is, $d_{ij}=d_{ij}-d_{ij}(\hat{E}_k)$.

The differences $d_{ij}(E_k)$ between probabilities of each of the events Ek for the respective combinations {Pi, Pj}, in which the flag value $F_{ij}$ is $0 \leq F_{ij} < 1$, are summed for each event Ek which is not yet employed as a monitor event, and a value obtained is set as a new determination degree Jk. That is, the following equation is obtained.

$$J_k = \sum_{\{ij|0 \leq F_{ij} < 1\}} d_{ij}(E_k) \quad (3)$$

If there is at least one combination {$P_i$, $P_j$} in which the flag value is $F_{ij}<1$, the monitor-event selection process is repeated until all the flag values $F_{ij}$ become $F_{ij} \geq 1$.

On the other hand, if the flag value $F_{ij} \geq 1$ is obtained for all the combinations {Pi, Pj}, a new discrimination degree and a new determination degree are not calculated and the monitor-event selection process is ended. However, if there is any combination between faults in which $F_{ij} \geq 1$ cannot be satisfied even if all the events are employed, the process is ended at the time at which the flag value $F_{ij}>0$ is satisfied. The change of an end value of the flag value $F_{ij}$ can be set if necessary by the importance-level setting unit 106 explained later.

Figure 5:
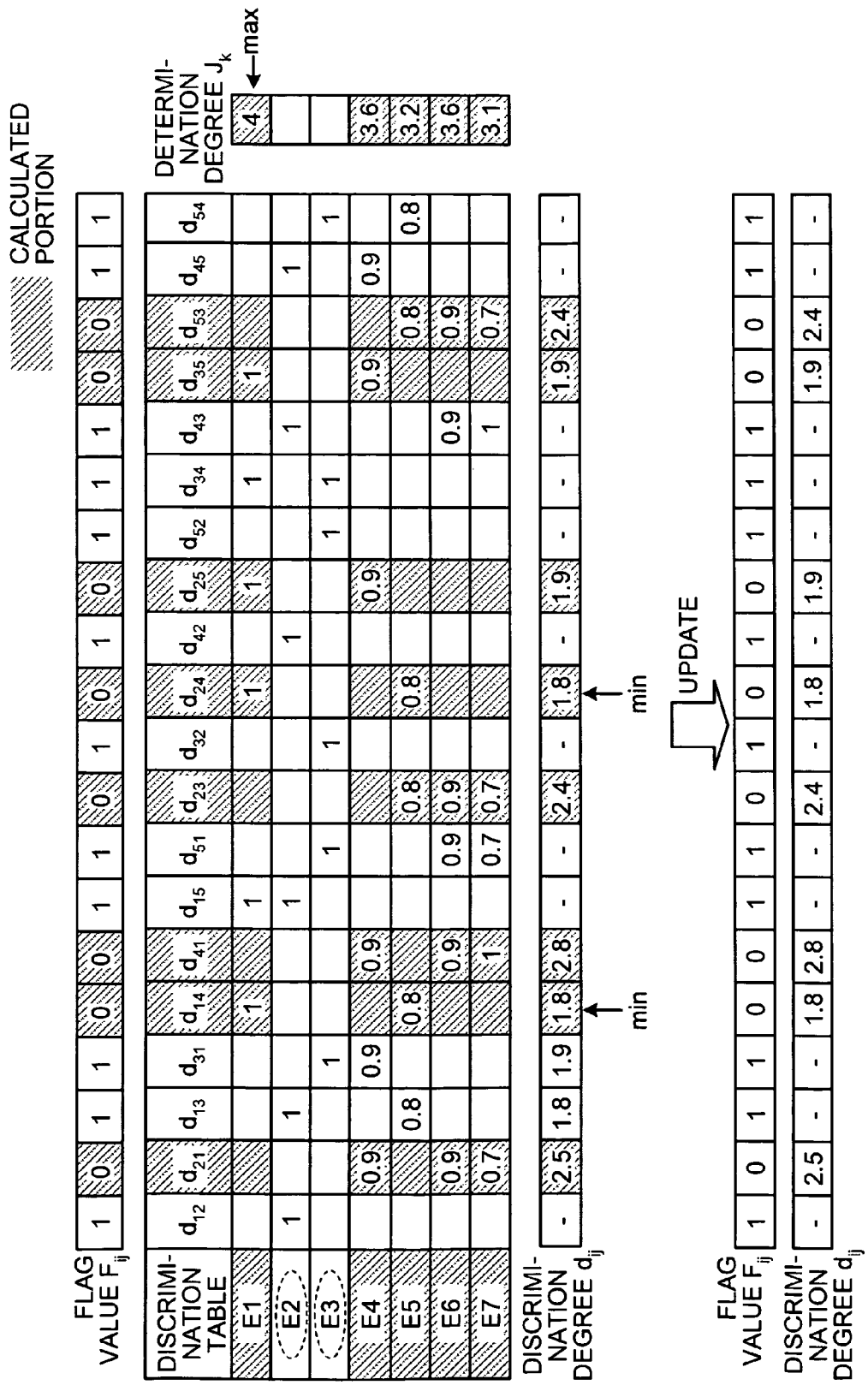
FIG. 5 is a diagram (2) of a procedure for selecting a monitor event.
Figure 6:
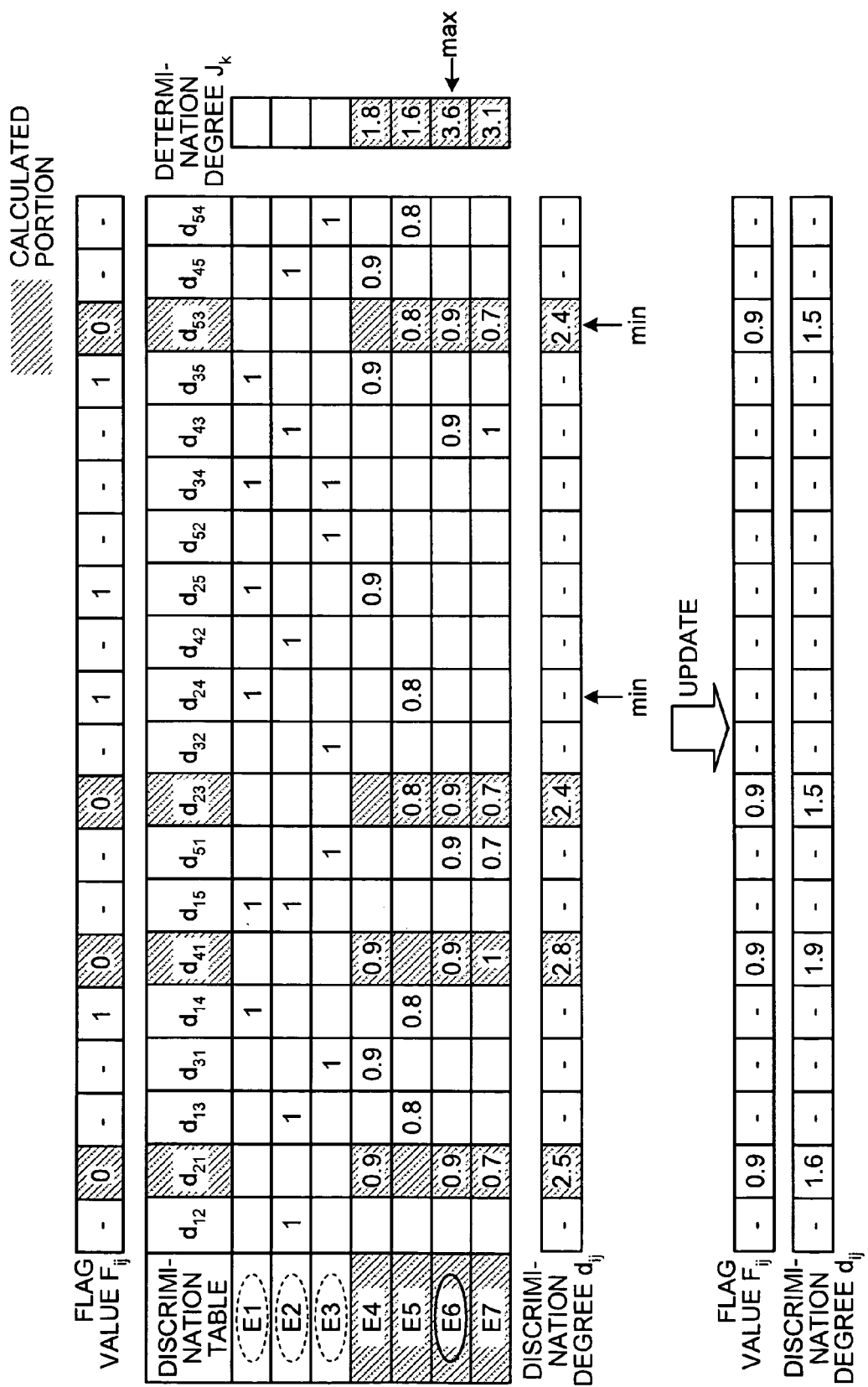
FIG. 6 is a diagram (3) of a procedure for selecting a monitor event.
Figure 7:
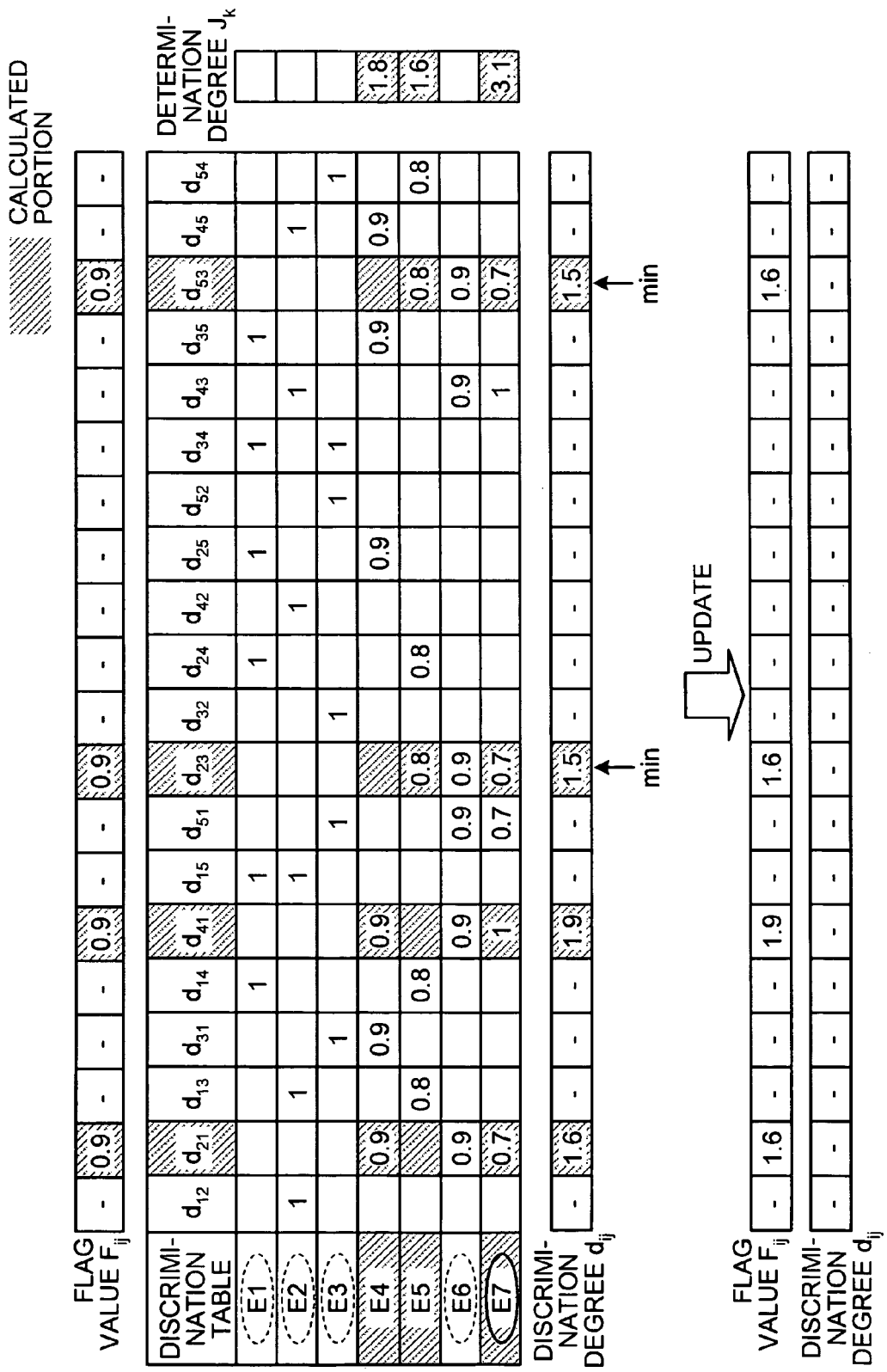
FIG. 7 is a diagram (4) of a procedure for selecting a monitor event.

In the examples of FIG. 5 to FIG. 7, the monitor-event selection process is repeated, and the events $E_1$, $E_6$, and $E_7$ are further employed as the monitor events in addition to E2 and E3. The example of FIG. 7 indicates that the monitor-event selection process is ended because all the values of the flag values F12 to F54 finally become 1 or more.

As explained above, the monitor event selector 105 extracts a minimum event required for uniquely identifying a fault, from the causal relation table 104, and sets the event extracted, as a trap event, in each device connected to the network 400 via the device setting unit 101. The event acquiring unit 102 sets the event extracted, as a periodic polling event that is periodically requested to each device, thereby reducing the traffic between the network fault diagnostic device 100 and each device connected to the network 400.

Figure 8:
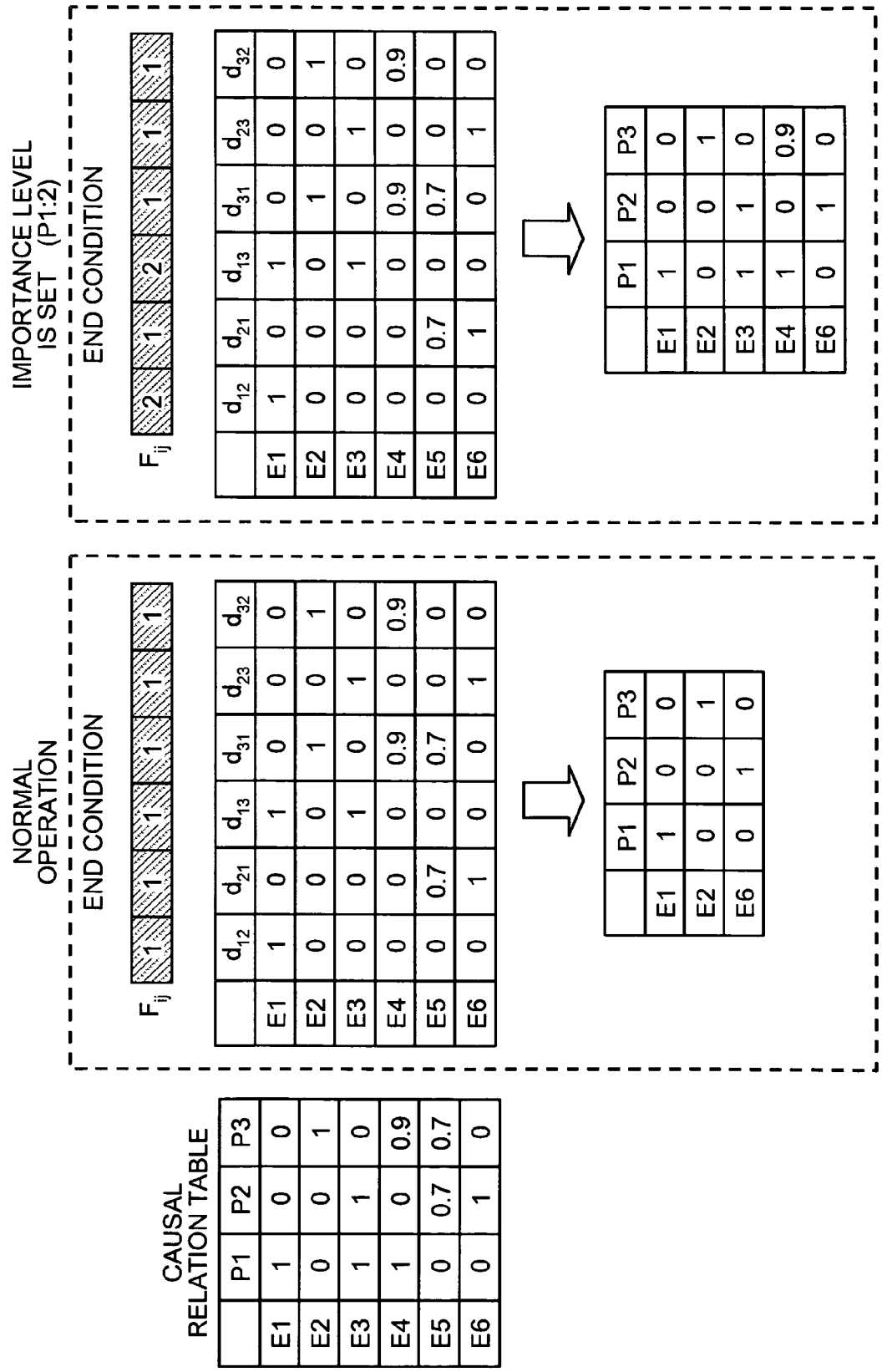
FIG. 8 is a diagram of how the monitor events selected change when an importance level is set.

The importance-level setting unit 106 is a processor that sets an end condition of the monitor-event selection process performed by the monitor event selector 105 based on an importance level for each fault input from an operator. More specifically, the importance-level setting unit 106 sets an end value of a flag value Fij for each combination of faults {$P_i$, $P_j$} in the monitor-event selection process performed by the monitor event selector 105, based on the importance level for each fault input from the operator. FIG. 8 is a diagram of how the monitor events selected change when the importance level is set. In the example, the importance level of the fault $P_1$ is set to 2, and events $E_3$ and $E_4$ are thereby added to the monitor events.

The importance-level setting unit 106 sets the end condition for the monitor-event selection process performed by the monitor event selector 105 based on the importance level for each fault input from the operator, which allows the monitor event selector 105 to select an event according to the importance level of the fault.

The acquisition-event selector 107 is a processor that selects a fault-trigger polling event from the causal relation table 104 based on latest fault candidates and requests the fault-trigger polling event from each device connected to the network 400. More specifically, the acquisition-event selector 107 selects a related event from the causal relation table 104 based on the fault candidates narrowed-down by the fault determining unit 108 explained later. The event selected here is called a "fault-trigger polling event". The fault-trigger polling event includes both the trap event and the periodic polling event classified in the causal relation table 104.

The acquisition-event selector 107 calculates a priority of each fault-trigger polling event selected and decides an acquisition order of events, which is effective for identifying the fault. Further, the acquisition-event selector 107 requests the fault-trigger polling events from each device connected to the network 400 via the event acquiring unit 102, in the acquisition order decided.

The procedure for deciding the acquisition order of the fault-trigger polling events performed by the acquisition-event selector 107 is explained below. At first, the acquisition-event selector 107 acquires related events from the causal relation table 104 based on the fault candidates narrowed-down by the fault determining unit 108 explained later. Then, the acquisition-event selector 107 calculates each priority $X(E_k)$ for each event $E_k$ acquired using the following equation, where $P_{ik}=P(E_k|P_i)$ $$X(E_k) = \frac{Number of elements satisfying P_{ik} \neq 0}{Number of elements in fault group} \quad (4)$$

$$\sum_{i, P_{ik} \neq 0} P_{ik} + \sum_{i, P_{ik} \neq 1} \{1 - P_{ik}\}$$

Figure 9:
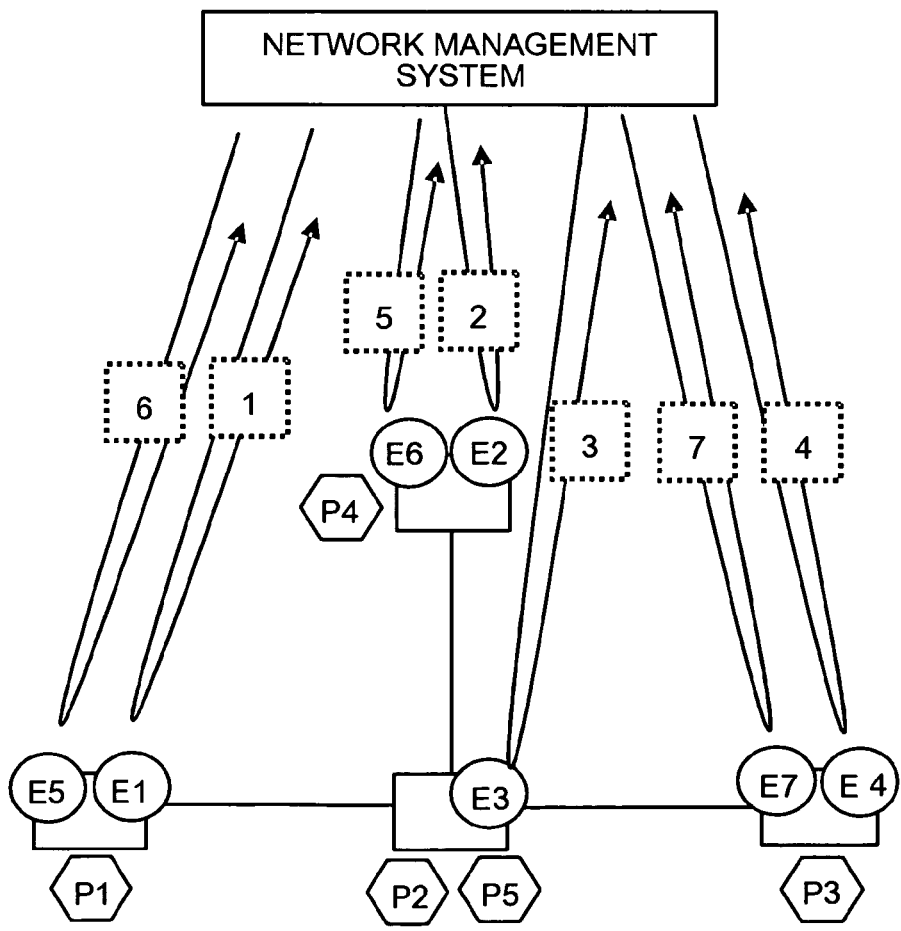
FIG. 9 is a diagram of set priorities of events to be acquired.

The priority is an expected value of the number of faults that can be narrowed-down by the events. The event acquiring unit 102 sequentially requests events, as the fault-trigger polling events, from the network 400, in the order of an event with a smaller value of the priority $X(E_k)$ FIG. 9 is a diagram of set priorities of events to be acquired. The example of FIG. 9 indicates a case where all the events stored in the causal relation table 104 of FIG. 2 are set as fault candidates. In this example, the priority is calculated for each of the events $E_1$, $E_2$, $E_3$, $E_4$, $E_5$, $E_6$, and $E_7$, as 3.8, 3.8, 3.8, 3.92, 4.04, 3.92, and 4.16, respectively. Therefore, the acquisition order becomes as follows: the events $E_1$, $E_2$, $E_3$, $E_4$, $E_6$, $E_5$, and $E_7$.

In this manner, the acquisition-event selector 107 selects the fault-trigger polling event from the causal relation table 104 based on the latest fault candidates, and sets the priority of the event selected. The event acquiring unit 102 requests the fault-trigger polling event from each device connected to the network 400 in the order of the priorities, thereby identifying the fault by the minimum event(s).

The fault determining unit 108 is a processor that extracts faults from the causal relation table 104 based on the events (trap event, periodic polling event, and fault-trigger polling event) sequentially received by the event receiving unit 103, and narrows down fault candidates. More specifically, the fault determining unit 108 refers to the causal relation table 104 based on the events received by the event receiving unit 103, extracts faults related to the events, and sets the faults as fault candidates. Further, the fault determining unit 108 stores a probability P(Ek|Pi) of the event Ek received in the certainty table 109 for each fault Pi being set as the fault candidate, as a certainty $C_i$ for each fault $P_i$.

When the event receiving unit 103 receives the next event, the fault determining unit 108 extracts related faults from the causal relation table 104 in the same manner as above, and performs a logical AND operation on the fault extracted and the fault already set as the fault candidate, thereby narrowing down the fault candidates. Further, the fault determining unit 108 calculates $C_i+P'$ from the certainty $C_i$ for each fault $P_i$ already stored in the certainty table 109 and a probability P'=P(Ek'|Pi) of a newly received event $E_k'$ for each fault $P_i$, and stores the value obtained in the certainty table 109 as a new certainty $C_i$.

On the other hand, when there is no sign of a fault in the event received, the fault determining unit 108 does not narrow down the fault candidates using the logical AND operation, but calculates $C_i+(1-P'')$ from the certainty $C_i$ for each fault $P_i$ stored in the certainty table 109 and a probability P"=P (Ek"|Pi) of a newly received event $E_k''$ for each fault $P_i$, and stores the value obtained in the certainty table 109 as a new certainty $C_i$.

The fault determining unit 108 repeats narrowing of the faults by the logical AND operation and updating of the certainty in the certainty table 109 based on the events sequentially received by the event receiving unit 103 until the faults as the fault candidates are narrowed down to one fault. When the faults being the fault candidates are narrowed down to one fault, the fault is notified to the operator.

FIG. 10 is a diagram of the procedure for determining a fault. In the example of FIG. 10, at first, the fault determining unit 108 receives the trap event E1, and extracts faults P1, P2, and P3 from the causal relation table 104 to set them as fault candidates. At this time, 1, 1, 1 are stored in the certainty table 109 as certainties for the faults P1, P2, and $P_3$, respectively.

Then, the fault determining unit 108 receives the fault-trigger polling event E5, extracts the faults P1, P2, and P3 from the causal relation table 104, performs a logical AND operation on the faults P1, P2, and P3 extracted and the faults P1, P2, and P3 already set as the fault candidates, and sets the faults P1 and P2 as new fault candidates. The certainties for the faults P1 and P2 in the certainty table 109 are updated to 1.8 and 1.8, respectively.

Then, the fault determining unit 108 receives the fault-trigger polling event $E_7$, but there is no sign of a fault in the event $E_7$. Therefore, the fault candidates are not narrowed-down by means of the logical AND operation, but only the certainties in the certainty table 109 are updated to 2.8 and 2.1, respectively.

Then, the fault determining unit 108 receives the fault-trigger polling event E2, extracts the faults P1 and P4, performs a logical AND operation on the faults P1 and P4 extracted and the faults P1 and P2 already set as the fault candidates, and identifies the fault as P1. The certainty for the fault P1 in the certainty table 109 is updated to 3.8. The fault P1 is notified to the operator.

Further, there is a case where when the fault determining unit 108 is to perform a logical AND operation on a set of faults, extracted from the causal relation table 104 based on the events received, and on a set of faults already set as fault candidates, both of these sets are in an exclusive relation. In this case, the fault determining unit 108 sets another new fault candidate based on the set of faults extracted from the causal relation table 104.

When receiving the next event, the fault determining unit 108 extracts a fault based on the event, and checks which of fault candidates is related to the fault extracted. When it is found that there is a relation only with the unique fault candidate, the fault determining unit 108 performs a logical AND operation on the fault and the fault candidate, thereby narrowing down the fault candidate. On the other hand, when there is a relation with a plurality of fault candidates, the fault determining unit 108 does not narrow down the fault candidates using the logical AND operation, but only updates the certainties in the certainty table 109.

Figure 11:
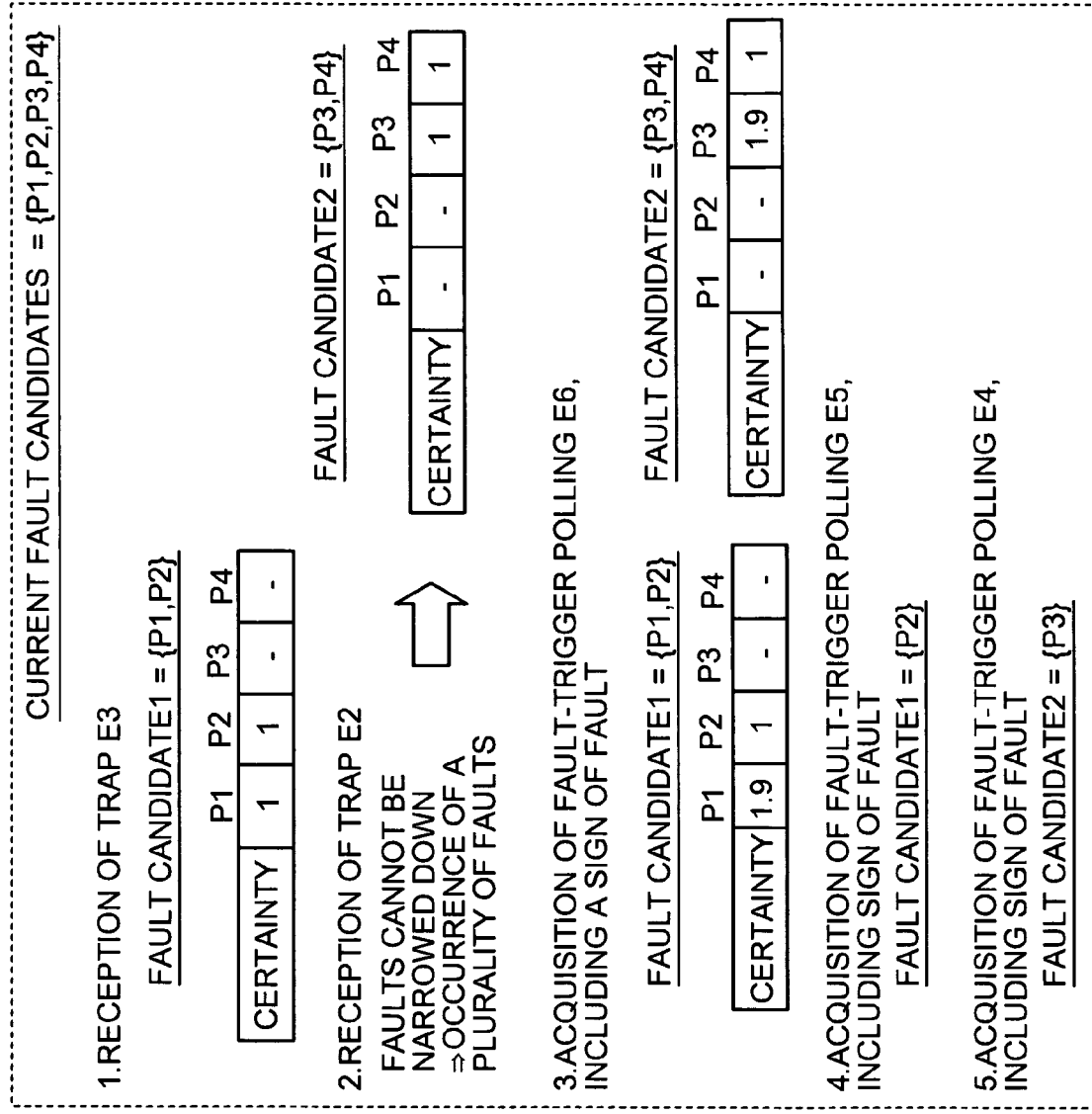
FIG. 11 is a diagram of a procedure for determining a fault when a plurality of faults occur.

FIG. 11 is a diagram of the procedure for determining a fault when a plurality of faults occurs. In the example of FIG. 11, at first, faults P1, P2, P3, and P4 are set as fault candidate 1. Then, the fault determining unit 108 receives the trap event E3, extracts the faults P1 and P2 from the causal relation table 104, and performs a logical AND operation on the faults P1 and P2 extracted and the faults P1, P2, P3, and P4 already set as the fault candidate 1, and sets the faults P1 and $P_2$ as new fault candidate 1.

Then, the fault determining unit 108 receives the trap event E2 to extract the faults P3 and P4. However, because the faults P3 and P4 extracted are in an exclusive relation with the faults P1 and P2 already set as the fault candidates, the faults $P_3$ and $P_4$ are set as new fault candidate 2.

Next, the fault determining unit 108 receives the fault-trigger polling event E6, and extracts the faults P2 and P3. However, because the faults P2 and P3 are in relation with both the fault candidate 1 and the fault candidate 2, the fault determining unit 108 does not narrow down the fault candidates, but only updates the certainties in the certainty table 109.

Then, the fault determining unit 108 receives the fault-trigger polling event E5, and extracts the fault P2. However, because the fault P2 is in relation with only the fault candidate 1, the fault determining unit 108 performs a logical AND operation on the fault P2 and the fault candidate 1, and identifies the fault P2. Then, the fault P2 is notified to the operator.

Then, the fault determining unit 108 receives the fault-trigger polling event E4, and extracts the fault P3. Because the fault P3 is in relation with the fault candidate 2, the fault determining unit 108 performs a logical AND operation on the fault P3 and the fault candidate 2, and identifies the fault P3. Then, the fault P3 is notified to the operator.

In this manner, the fault determining unit 108 narrows down the fault candidates one by one while extracting them from the causal relation table 104, based on the events sequentially received by the event receiving unit 103, thereby finally identifying one fault.

Further, the fault determining unit 108 sets a plurality of fault candidates, and concurrently narrows down faults for the respective fault candidates, thereby identifying each of the faults even when the faults occur at the same time on the network 400.

The certainty table 109 is a memory unit that stores certainty for each fault which is set as a fault candidate. The certainty is updated at anytime by the fault determining unit 108 in the process of narrowing down the fault candidates based on the event acquired.

Figure 12:
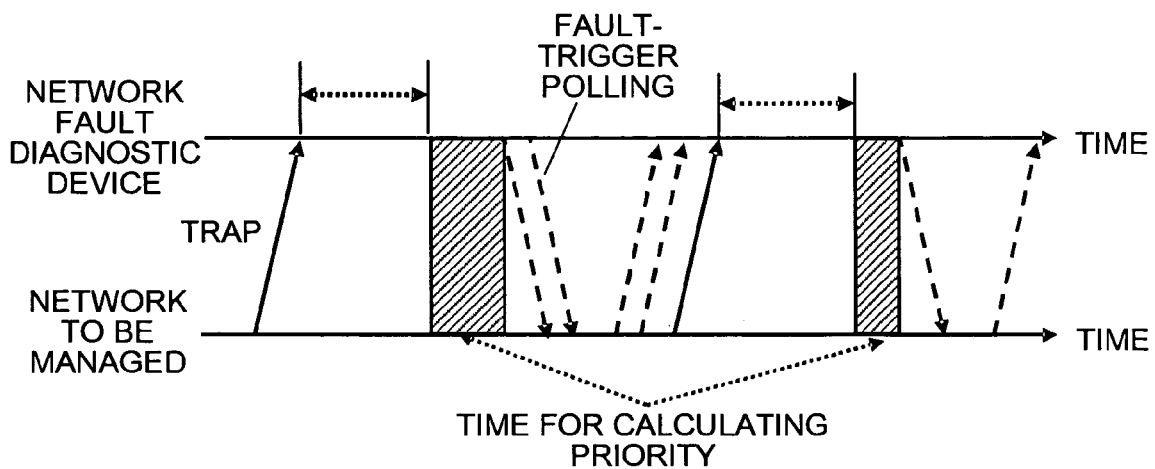
FIG. 12 is a diagram of how to control a timing of calculating the priority of an event to be acquired by a timer.

The timer 110 is a processor that controls a start timing of calculating the priority of an event by the acquisition-event selector 107. FIG. 12 is a diagram of how to control a timing of calculating the priority of an event to be acquired by an timer. The timer 110 observes whether a predetermined time has elapsed since the event receiving unit 103 has received an event, and controls so that the acquisition-event selector 107 starts calculating the priority of the event.

The timer 110 controls the start timing of calculating the priority of an event by the acquisition-event selector 107. And while the event receiving unit 103 is continuously receiving events, the timer 110 prohibits the event acquiring unit 102 from requesting the fault-trigger polling event from each device connected to the network 400 after the calculation of the priority, thereby reducing events exchanged with the network 400.

Figure 13:
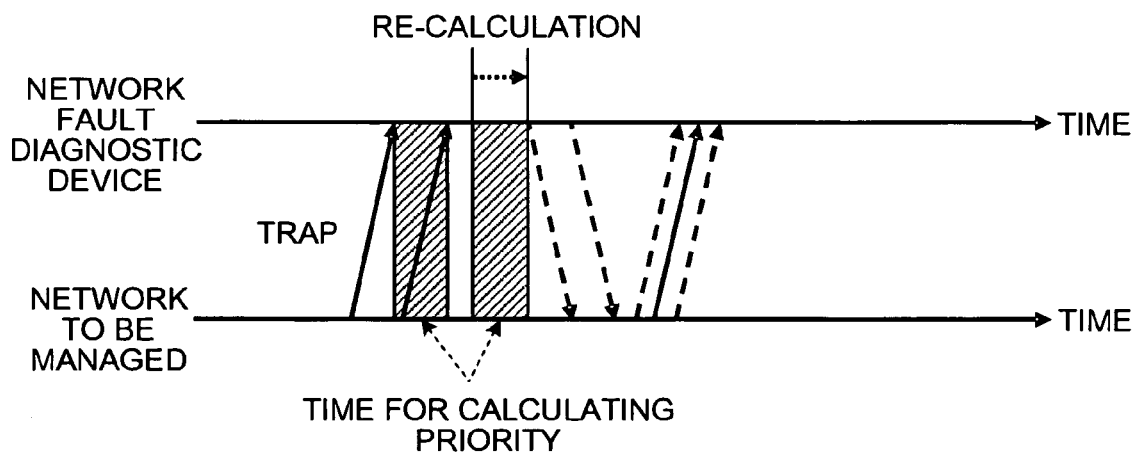
FIG. 13 is a diagram of how to re-calculate the priority due to an interrupt of a monitor event during calculation of the priority of an event to be acquired.

The interrupt instructing unit 111 is a processor that instructs the acquisition-event selector 107 so as to re-calculate the priority, when a new event is received during which the acquisition-event selector 107 is calculating the priority of an event and fault candidates thereby need to be narrowed down. FIG. 13 is a diagram of how to re-calculate the priority due to an interrupt of a monitor event during calculation of the priority of an event to be acquired. When the event receiving unit 103 receives a new event during which the acquisition-event selector 107 calculates the priority of an event and the fault determining unit 108 thereby needs to narrow down the fault candidates, the interrupt instructing unit 111 transfers the fault candidates after being narrowed-down, to the acquisition-event selector 107, and further instructs the acquisition-event selector 107 so as to stop calculation of the priority during execution, and to calculate the priority based on the fault transferred.

When a new event is received during execution of calculating the priority, the interrupt instructing unit 111 instructs the acquisition-event selector 107 so as to stop calculation, and thereby enables control so as not to request an unnecessary fault-trigger polling event from each device connected to the network 400.

Figure 14:
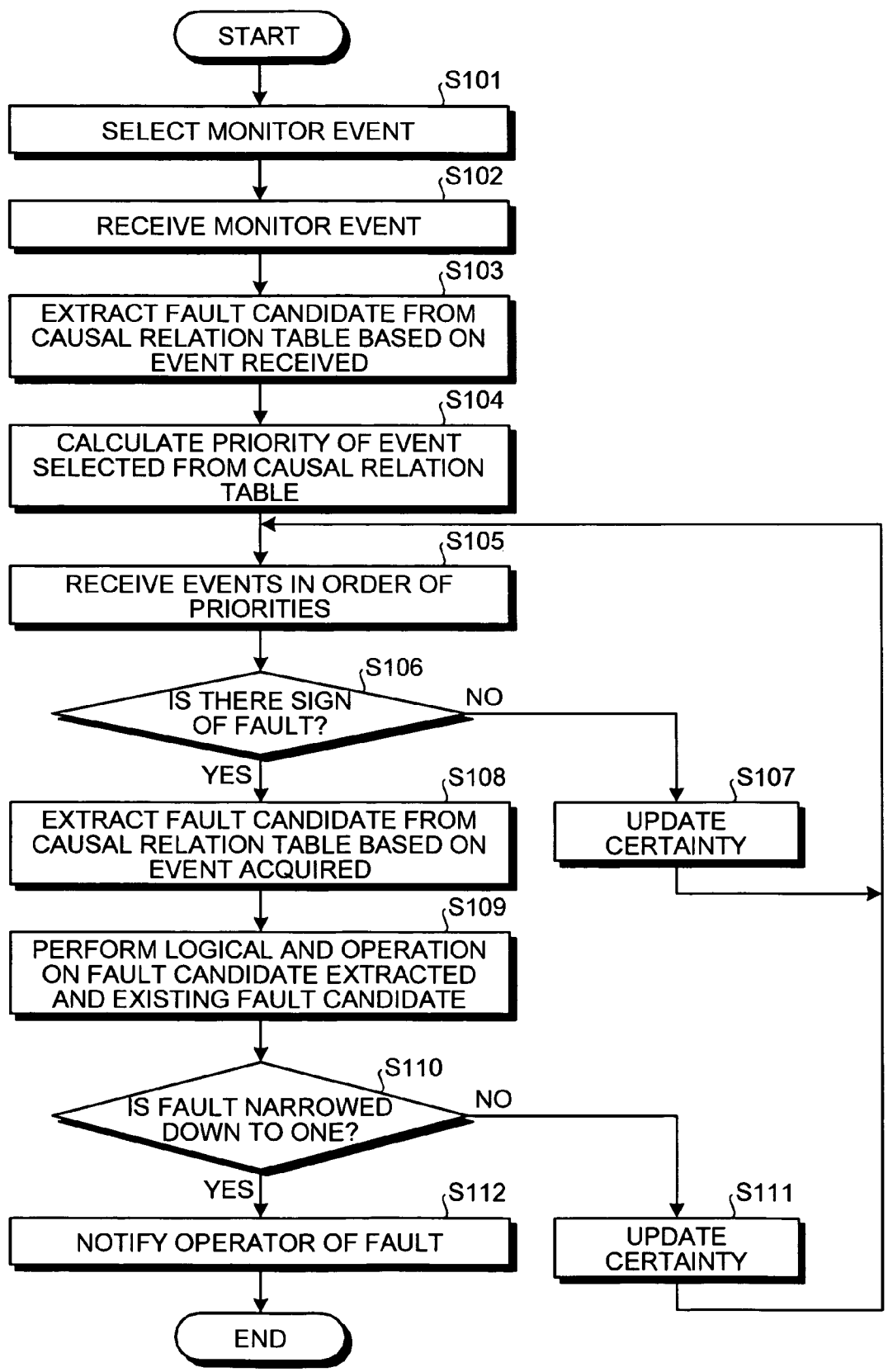
FIG. 14 is a flowchart of a process procedure in the network fault diagnostic device according to the first embodiment.

FIG. 14 is a flowchart of the process procedure in the network fault diagnostic device 100 according to the first embodiment. In the network fault diagnostic device 100, at first, the monitor event selector 105 performs a monitor-event selection process to select monitor events (trap event and periodic polling event) from the causal relation table 104 (step S101).

Then, the event receiving unit 103 receives the monitor events (step S102), and the fault determining unit 108 extracts fault candidates from the causal relation table 104 (step S103).

The timer 110 observes whether a predetermined time has elapsed since the event receiving unit 103 has received the monitor events, and then the acquisition-event selector 107 selects an event related a fault candidate from the causal relation table 104 and calculates the priority of the event selected (step S104). When the event receiving unit 103 receives a new event in the middle of calculation of the priority, the interrupt instructing unit 111 controls the acquisition-event selector 107 so as to re-calculate the priority.

After the calculation of the priority, the event acquiring unit 102 requests fault-trigger polling events from each device connected to the network 400, in the order of the priorities.

The event receiving unit 103 receives the fault-trigger polling event from a device connected to the network 400 (step S105). If there is any sign of a fault in the event (step S106, Yes), the fault determining unit 108 extracts fault candidates from the causal relation table 104 (step S108), and narrows down the fault candidates by performing a logical AND operation on each of the fault candidates and each of existing fault candidates (step S109).

If the fault candidates are narrowed down to one fault (step S110, Yes), the fault is notified to the operator, and the process is ended (step S112). On the other hand, if the fault candidates still remain as a plurality of faults (step S110, No), the certainties of the faults are updated (step S111), and the processes at step S105 and thereafter are repeated until the fault candidates are narrowed down to one fault based on the events sequentially received by the event receiving unit 103.

In this manner, the acquisition-event selector 107 selects the events from the causal relation table 104 based on the latest fault candidates and decides an acquisition order in which a fault can be efficiently identified for each of the events selected. The event acquiring unit 102 requests events from each device connected to the network 400 in the acquisition order decided, and the fault determining unit 108 narrows down fault candidates based on the events received one by one, thereby efficiently identifying the fault with a less number of events.

Figure 15:
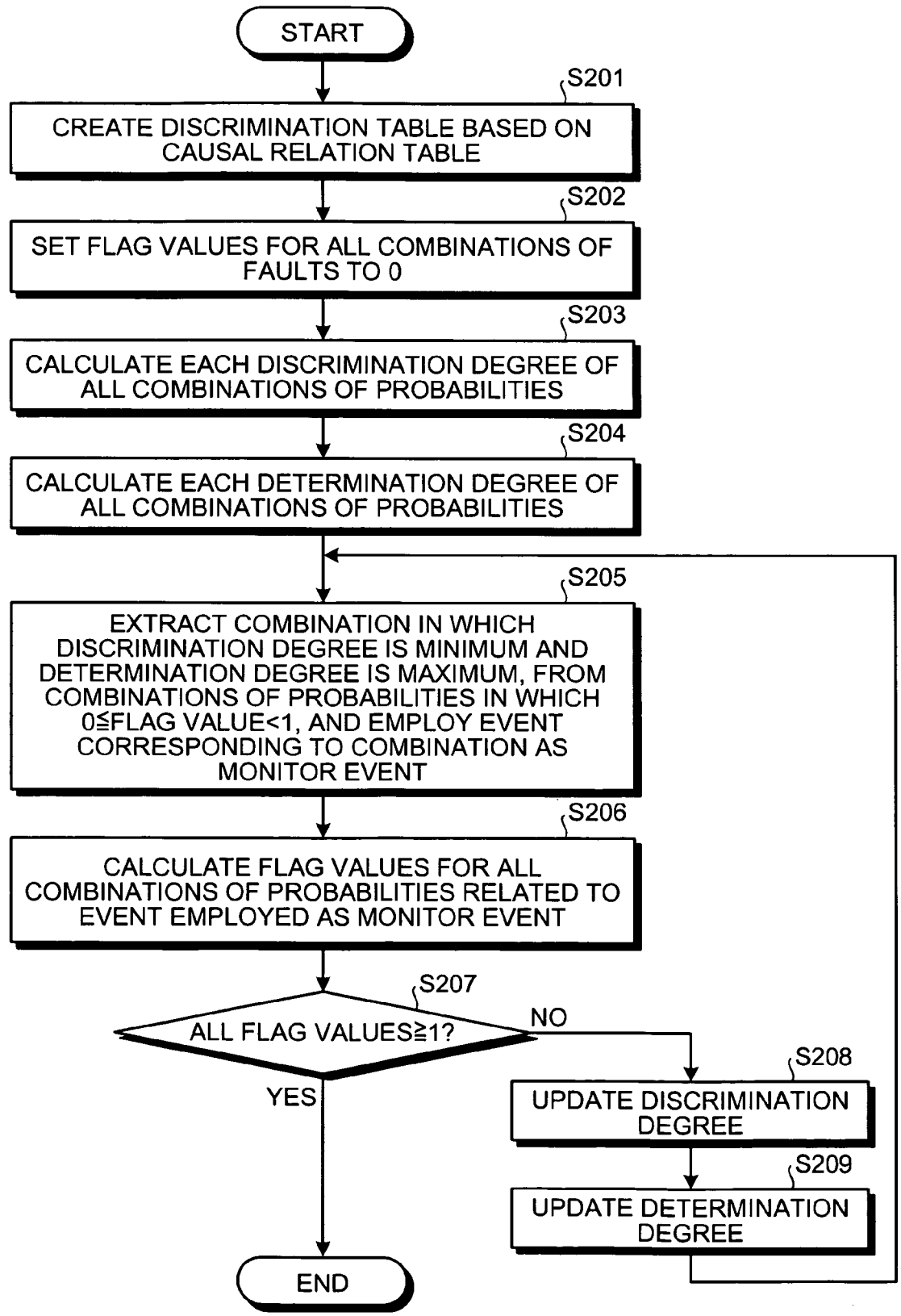
FIG. 15 is a flowchart of a process procedure for a monitor-event selection process shown in FIG. 14.

FIG. 15 is a flowchart of the process procedure for the monitor-event selection process shown in FIG. 14. In the monitor-event selection process, at first, a discrimination table is created based on the causal relation table 104 (step S201).

Then, flag values for all combinations of the faults are set to 0 (step S202), and each discrimination degree of all the combinations is calculated (step S203). Further, each determination degree of all the events is calculated (step S204).

A combination of faults of which discrimination degree is the minimum is extracted from the combinations of faults in which $0 \leq$ flag value$<1$, and an event of which determination degree is the maximum is extracted from events for the combination of the faults extracted, and the event extracted is employed as a monitor event (step S205).

The flag values for all the combinations of the faults are calculated so as to enable discrimination of the events, employed as the monitor events, from each other (step S206). When all the flag values for all the combinations of the faults in the discrimination table become 1 or more (step S207, Yes), then the monitor-event selection process is ended.

On the other hand, if some combinations of the faults each of which flag value$<1$ are still in the discrimination table (step S207, No), the discrimination degree is updated (step S208) and the determination degree is updated (step S209), and the processes at step S205 and thereafter are repeated until the flag values for all the combinations of the faults in the discrimination table become 1 or more.

In this manner, the monitor event selector 105 extracts minimum events required for uniquely identifying a fault, from the causal relation table 104, to set the events as monitor events (trap event and periodic polling event), thereby reducing the traffic between the network fault diagnostic device 100 and each device connected to the network 400.

In the first embodiment, as explained above, the causal relation table 104 stores causal relations between faults and events, and the monitor event selector 105 refers to the causal relation table 104 to extract minimum events required for identifying a fault, and sets the events as monitor events. Therefore, the events that are exchanged with each device connected to the network 400 can be limited to the necessity minimum, and this allows reduction of the traffic occurring between the network fault diagnostic device 100 and each device connected to the network 400.

In the first embodiment, the acquisition-event selector 107 selects events from the causal relation table 104 based on the latest fault candidates, and sets priorities of the events selected in the order of efficiently identifying faults. The event acquiring unit 102 requests the events in the order of the priorities set, and the event receiving unit 103 receives each event in response to the respective requests. The fault determining unit 108 narrows down the fault candidates based on the events received one by one. Therefore, the fault determining unit 108 can efficiently identify a fault with a less number of events, thereby reducing the traffic occurring between the network fault diagnostic device 100 and each device connected to the network 400.

The case where the values of probabilities of events for a fault stored in the causal relation table 104 are fixed is explained in the first embodiment. However, the probabilities of events for a fault may dynamically change depending on the operational status of each device connected to the network 400. Therefore, in a second embodiment of the present invention, the following example is explained. The example is such that the probabilities previously stored in the causal relation table 104 are dynamically updated according to the status of the network 400.

Figure 16:
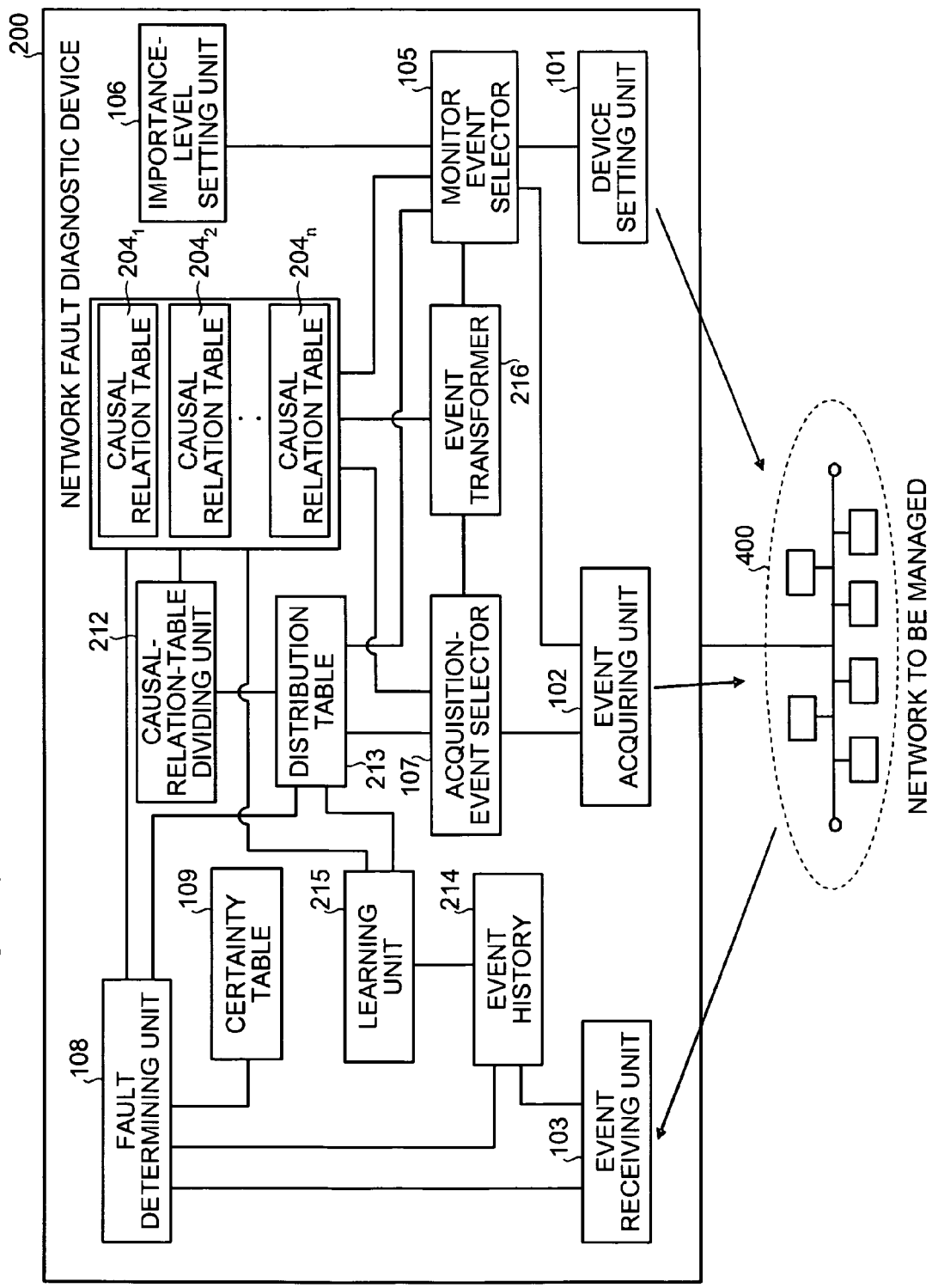
FIG. 16 is a functional block diagram of a network fault diagnostic device according to a second embodiment of the present invention.

FIG. 16 is a functional block diagram of a network fault diagnostic device 200 according to the second embodiment. For convenience in explanation, the same reference numerals are assigned to functions that play the same roles as these in FIG. 2, and explanation thereof is omitted. As shown in FIG. 16, the network fault diagnostic device 200 is connected to the network 400 to be managed being a target of which fault is monitored.

The network fault diagnostic device 200 includes the device setting unit 101, the event acquiring unit 102, the event receiving unit 103, causal relation tables $204_1$ to $204_n$, the monitor event selector 105, the importance-level setting unit 106, the acquisition-event selector 107, the fault determining unit 108, the certainty table 109, a causal-relation-table dividing unit 212, a distribution table 213, an event history 214, a learning unit 215, and an event transformer 216.

The causal relation tables $204_1$ to $204_n$ are memory units that store causal relations between events and faults. Each of the causal relation tables $204_1$ to $204_n$ stores probabilities of events for faults in correlation with the causal relations. The causal relation tables $204_1$ to $204_n$ also divide combinations of each fault with each event into sets having no correlation between the causal relations.

The causal-relation-table dividing unit 212 is a processor that divides the causal relation tables $204_1$ to $204_n$. FIG. 17 is a diagram of the procedure for dividing the causal relation tables $204_1$ to $204_n$. The causal-relation-table dividing unit 212 creates sets having no correlation between causal relations, from all the combinations of faults with events, based on the causal relations between the faults and the events stored in the causal relation tables $204_1$ to $204_n$, and divides the sets into other causal relation tables $204_1$ to $204_n$ to be stored therein, respectively. The causal-relation-table dividing unit 212 stores information in the distribution table 213 for each event, the information indicating a correlation between each event and each of the causal relation tables $204_1$ to $204_n$.

The causal-relation-table dividing unit 212 classifies the combinations between each fault and each event into sets having no correlation between causal relations, and dividing the sets into the causal relation tables $204_1$ to $204_n$ to be stored therein, respectively, thereby reducing a memory unit area as a whole required for the causal relation tables $204_1$ to $204_n$.

The distribution table 213 is a memory unit that stores information indicating the causal relation tables $204_1$ to $204_n$, in which information for an event is stored for each event, in correlation with each other. FIG. 18 is a diagram of an example of the distribution table 213. The example indicates that the causal relation tables $204_1$ to $204_n$ are divided into two tables (table A and table B), and the events $E_1$ to $E_5$ are stored in the table A, while the events $E_6$ to $E_8$ are stored in the table B.

The event history 214 is a memory unit that stores a history of the fault identified by the fault determining unit 108 and a history of the events received by the event receiving unit 103. More specifically, the event history 214 stores the history of the fault identified by the fault determining unit 108 and the history of the events received by the event receiving unit 103 in the process of identifying the fault, in correlation with each other.

The learning unit 215 is a processor that refers to the histories of the fault and the events stored in the event history 214 to update the causal relation tables $204_1$ to $204_n$. More specifically, the learning unit 215 refers to the histories of the fault and the events stored in the event history 214, and calculates each probability of an event Ek for the fault Pi using (frequency of occurrence of Ek)/(frequency of occurrence of Pi), to update each probability of the causal relation tables $204_1$ to $204_n$.

The learning unit 215 calculates the probability of the event for the fault based on the histories of the fault and the events stored in the event history 214, and dynamically updates the causal relation tables $204_1$ to $204_n$, thereby causing the probabilities of the events for the faults stored in the causal relation tables $204_1$ to $204_n$, to be changed to more accurate values.

Figure 19:
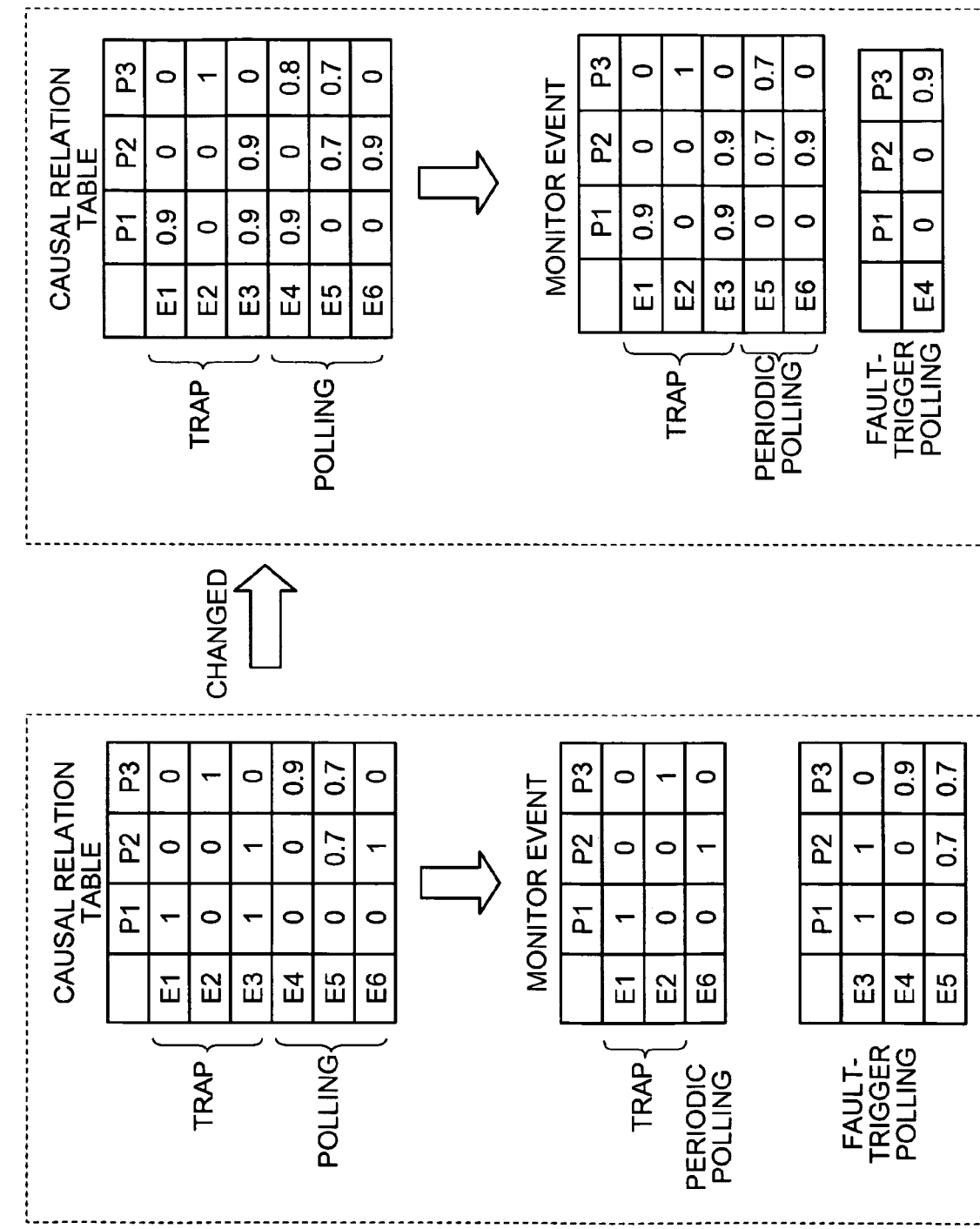
FIG. 19 is a diagram of how to transform combinations of events due to a change of the causal relation table.

The event transformer 216 is a processor that dynamically changes a trap event, a periodic polling event, and a fault-trigger polling event, according to changes of the causal relation tables $204_1$ to $204_n$. FIG. 19 is a diagram of how to transform combinations of events due to a change of the causal relation tables $204_1$ to $204_n$. When the causal relation tables $204_1$ to $204_n$ are updated by the learning unit 215, or when initial settings are provided to the causal relation tables $204_1$ to $204_n$, the event transformer 216 starts the monitor event selector 105, and selects monitor events (the trap event and the periodic polling event) from the causal relation tables $204_1$ to $204_n$. Further, the event transformer 216 extracts an event, which has not been selected as the monitor event, from the causal relation tables $204_1$ to $204_n$, and sets the event as an event (fault-trigger polling event) being a target of which priority is calculated by the monitor event selector 105.

The event transformer 216 dynamically sets the trap event, the periodic polling event, and the fault-trigger polling event at a timing at which the probabilities stored in the causal relation tables $204_1$ to $204_n$ are updated, thereby selecting a more efficient combination of events for identifying a fault.

In the second embodiment, as explained above, the event history 214 stores histories of the faults and events, the learning unit 215 updates the probabilities in the causal relation tables $204_1$ to $204_n$ to more accurate values by referring to the event history 214, and the event transformer 216 dynamically sets the trap event, the periodic polling event, and the fault-trigger polling event at a timing at which the probabilities stored in the causal relation tables $204_1$ to $204_n$ are updated, thereby selecting a more efficient event for identifying a fault.

Furthermore, in the second embodiment, the causal-relation-table dividing unit 212 classifies combinations based on the causal relations between the events and the faults into sets having no correlation between the causal relations, divides the sets into the causal relation tables $204_1$ to $204_n$, and stores them therein, respectively. Therefore, a required storage capacity can be reduced as compared with the case where all the causal relations are stored in one causal relation table.

The network fault diagnostic device is explained in the first and second embodiments, but by implementing the configuration of the network fault diagnostic device with software, a network fault diagnostic program having the same function as explained above can be obtained. A computer that executes the network fault diagnostic program is therefore explained below.

Figure 20:
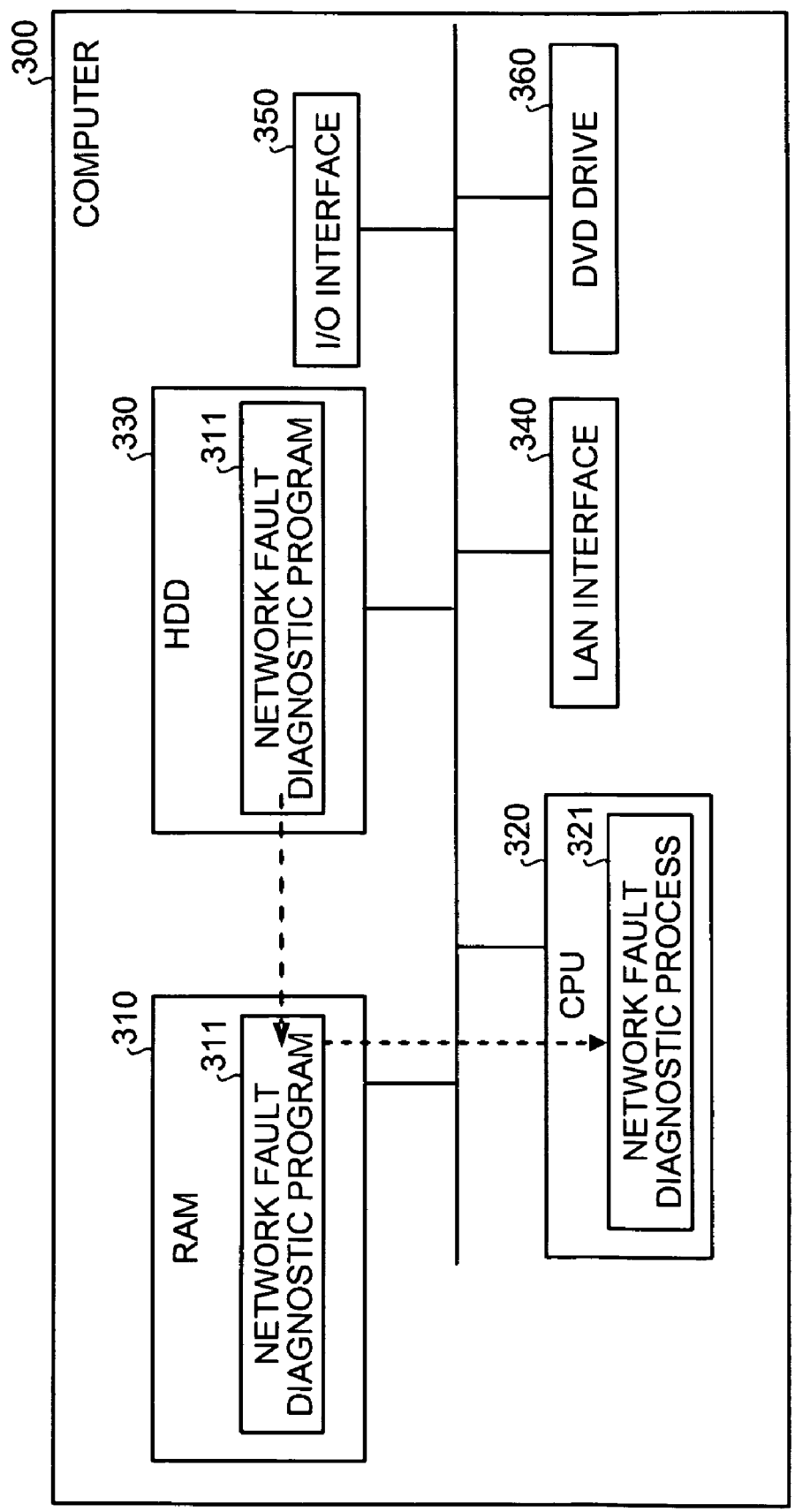
FIG. 20 is a functional block diagram of a computer that executes a network fault diagnostic program according to the embodiments of the present invention.

FIG. 20 is a functional block diagram of a computer that executes the network fault diagnostic program according to the embodiments of the present invention. A computer 300 includes a Random Access Memory (RAM) 310, a Central Processing Unit (CPU) 320, a Hard Disk Drive (HDD) 330, a Local Area Network (LAN) interface 340, an Input-Output (I/O) interface 350, and a Digital Versatile Disk (DVD) drive 360.

The RAM 310 is a memory that stores programs and a result of execution of a program in progress. The CPU 320 is a central processing unit that reads a program from the RAM 310 and executes the program.

The HDD 330 is a disk drive that stores programs and data. The LAN interface 340 is an interface for connecting the computer 300 to another computer via the LAN.

The I/O interface 350 is an interface for connecting an input device such as a mouse and a keyboard and a display unit to the computer 300. The DVD drive 360 is a device that reads and writes data from and to a DVD.

A network fault diagnostic program 311 executed in the computer 300 is stored in the DVD and is read from the DVD by the DVD drive 360 to be installed on the computer 300.

Alternatively, the network fault diagnostic program 311 is stored in databases of other computer systems connected to the computer 300 via the LAN interface 340, and is read from these databases to be installed on the computer 300.

The network fault diagnostic program 311 installed thereon is stored in the HDD 330, read to the RAM 310, and executed as a network fault diagnostic process 321 by the CPU 320.

According to one aspect of the present invention, a fault can be efficiently identified by a necessity minimum event. Thus, the traffic occurring on the network for identifying the fault can be reduced.

Furthermore, the number of events to be transmitted by each device connected to the network upon occurrence of a fault can be limited to the minimum. Thus, the traffic occurring on the network upon occurrence of the fault can be reduced.

Moreover, a fault can be efficiently identified by a less number of events. Thus, the traffic occurring on the network for identifying the fault can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network fault diagnostic device that identifies a fault based on a causal relation between a fault occurring on a network and an event indicating a sign of the fault, comprising:
   a storage unit to store therein a plurality of probabilities indicating the causal relation by which each of a plurality of faults occurs subsequent to each of a plurality of events;
   an event acquiring unit to select a minimum event required for identifying an occurring fault based on differences between two of the plurality of probabilities that respectively correspond to two different faults for an identical event and to acquire selected event from each device connected to the network; and
   a fault determining unit to identify the occurring fault by extracting a set of first fault candidates having the causal relation with the event acquired by the event acquiring unit and obtaining a set common to the first fault candidates and second fault candidates corresponding to the event previously acquired by the event acquiring unit.

2. The network fault diagnostic device according to claim 1, wherein the event acquiring unit to calculate a priority of each event based on the probabilities stored in the storage unit, decides an acquisition order of events capable of efficiently identifying the occurring fault, and to acquire the events in the acquisition order from each device connected to the network.

3. The network fault diagnostic device according to claim 2, wherein once a next event cannot be acquired after a predetermined time is elapsed since one event is acquired, the event acquiring unit to start calculating the priority.

4. The network fault diagnostic device according to claim 2, wherein once an event is acquired during calculation of the priority, the event acquiring unit to stop the calculation and re-calculates the priority.

5. The network fault diagnostic device according to claim 1, wherein
   the fault determining unit to prepare information about identified fault and history information indicative of an event acquired for identifying the fault, and
   the storage unit to dynamically update the probability based on the history information prepared by the fault determining unit.

6. The network fault diagnostic device according to claim 5, wherein the fault determining unit to store certainties, and to dynamically select an event according to the change of the probability stored in the storage unit.

7. The network fault diagnostic device according to claim 1, wherein the event acquiring unit to set an importance level of a fault based on an instruction from an operator, and to select an event according to the importance level.

8. A method of identifying a fault based on a causal relation between a fault occurring on a network and an event indicating a sign of the fault, comprising:
   preparing a plurality of probabilities indicating the causal relation by which each of a plurality of faults occurs subsequent to each of a plurality of events;
   selecting a minimum event required for identifying an occurring fault based on differences between two of the plurality of probabilities that respectively correspond to two different faults for an identical event;
   acquiring the event selected at the selecting from each device connected to the network; and
   identifying the occurring fault by extracting a set of first fault candidates having the causal relation with the event acquired at the acquiring and obtaining a set common to the first fault candidates extracted and second fault candidates corresponding to the event previously acquired.

9. A computer-readable recording medium that stores therein a computer program that causes a computer to implement a method of identifying a fault based on a causal relation between a fault occurring on a network and an event indicating a sign of the fault, the computer program causing the computer to execute:

preparing a plurality of probabilities indicating the causal relation by which each of a plurality of faults occurs subsequent to each of a plurality of events;

selecting a minimum event required for identifying an occurring fault based on differences between two of the plurality of probabilities that respectively correspond to two different faults for an identical event;

acquiring the event selected at the selecting from each device connected to the network; and identifying the occurring fault by extracting a set of first fault candidates having the causal relation with the event acquired at the acquiring and obtaining a set common to the first fault candidates extracted and second fault candidates corresponding to the event previously acquired.

10. An event selecting device that selects an event to be acquired from a network device based on a causal relation between a fault occurring on a network and an event indicating a sign of the fault, comprising:

a storage unit to store therein a plurality of probabilities indicating the causal relation by which each of a plurality of faults occurs subsequent to each of a plurality of events; and an event selector to select a minimum event required for identifying an occurring fault based on differences between two of the plurality of probabilities that respectively correspond to two different faults for an identical event, and to set selected event as an event to be acquired from each device connected to the network.

* * * * *